3,674,330

ACHROMATIC DOUBLET LENS FOR INFRARED RADIATION

Filed Jan. 22, 1971

INVENTOR
JOHN D. STRONG
BY
ATTORNEYS

United States Patent Office 3,674,330
Patented July 4, 1972

3,674,330
ACHROMATIC DOUBLET LENS FOR INFRARED RADIATION
John D. Strong, 5 Chadwick Court, Echo Hill, Amherst, Mass. 01002
Filed Jan. 22, 1971, Ser. No. 108,937
Int. Cl. G02b 1/02, 13/14
U.S. Cl. 350—2
11 Claims

ABSTRACT OF THE DISCLOSURE

The achromatic doublet lens disclosed herein employs a pair of optical elements, each of which is constructed of a respective infrared transparent alkali halide. By appropriately selecting the two alkali halides in accordance with the teachings of the present invention, the resulting doublet is caused to be substantially achromatic over a useful range of wavelengths, rather than just at a pair of preselected wavelengths as would be the case if the two infrared transparent materials were arbitrarily selected.

BACKGROUND OF THE INVENTION

This invention relates to lenses for infrared radiation and more particularly to a doublet lens which is effectively achromatic over a substantial band of wavelengths. In optical instruments intended for use with infrared radiation, image-forming has heretofore typically been provided by means of mirrors rather than by lenses since mirrors are inherently achromatic. The small field characteristics of the mirrors used are such that either the field acceptance angle or the entrance aperture must often be restricted in the design of instruments that use them. In various optical systems, e.g., those employed in Hadamard transform spectroscopy, this restriction can be troublesome in that it is desirable that radiation be gathered over a substantial solid angle of field in combination with a large entrance aperture.

While various materials which are substantially transparent to infrared radiation have been used heretofore as windows, prisms and occasionally as simple lenses, there has heretofore not been available any reasonably economic lens system which was suitable for use over a substantial range of infrared wavelengths. The state-of-the-art as it relates to infrared lenses has been presented by Hertzberger and Salzberg [J. Opt. Soc. Am. 52, pp. 420–427 (1962)]. They specify indices of refraction of 14 materials transparents in the spectral region $2\mu$ to $5\mu$. However, these materials are not suitable for an achromatic doublet that is workable over an extended wavelength range.

Among the several objects of the present invention may be noted the provision of a lens which is essentially achromatic over a substantial range of wavelengths in the infrared region; the provision of such a lens which can be constructed in relatively large sizes, e.g., as large as ten inches diameter; the provision of such a lens which is highly achromatic over its entire wavelength range rather than being achromatic at only a pair of predetermined design wavelength; the provision of such a lens which may be constructed in desirable combinations of diameters and focal lengths to provide substantial radiation throughout; the provision of such a lens which is relatively simple and inexpensive. Other objects and features will be in part apparent and in part pointed out hereinafter.

SUMMARY OF THE INVENTIION

Briefly, a doublet lens according to the present invention is substantially achromatic over a substantial range of infrared wavelengths. The lens is a doublet comprising a pair of lens elements, each element being constructed of a respective one of a pair of alkali halide materials, the pair being selected from the group of pairs consisting of NaCl—KCl
KBr—NaCl
KI—KBr, and
CsI—CsBr When the summed curvatures for each of the two elements are selected so that the doublet has the same focal length at two preselected design wavelengths; then it will have the same focal length over a broad spectrum extending between and beyond the design points, due to the matching of the dispersive characteristics of the two materials in each of the selected pairs.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
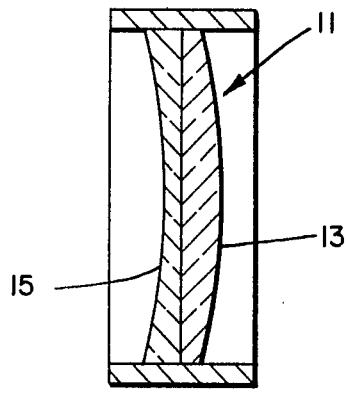
FIG. 1 is a side view, in section, of a relatively simple doublet lens constructed in accordance with the present invention emphasizing thin elements.

Referring now to FIG. 1, there is indicated at 11 generally an achromatic doublet lens constructed in accordance with the present invention. Lens 11 is a doublet comprising two component elements each of which may be considered to be relatively thin so as to simplify analysis of its achromatism as is understood by those skilled in the art. The two elements are a plano-convex positive element 13 and a plano-concave negative element 15, the plane surfaces of the two elements being in optical contact. As is explained in greater detail hereinafter, the two elements are constructed of different alkali halide materials, the positive element 13 being constructed of the material having the lower dispersion of its index of refraction.

The lens elements 13 and 15 may be constructed according to conventional techniques for the fabrication of optical elements from alkali halide materials. For example, single crystal pieces of the selected material may be wet string sawed to approximate shape and then ground, polished and figured to give the desired optical finish. The plane surfaces of the lens elements 13 and 15 are mechanically held in optical contact, as indicated. In the preferred embodiment illustrated, the lens elements mate at planar surfaces to facilitate the establishment of optical contact but it should be understood that non-planar mating surfaces may also be employed. An alternative method of construction is to hot-press the lens elements into the desired shape and to then hot weld the two elements together as disclosed in my co-pending application Ser. No. 199,510, filed Nov. 17, 1971.

In the relatively simple embodiment illustrated in FIG. 1, where the lens elements 13 and 15 can be considered to meet the assumptions generally made in so-called "thin" lens calculations, the elements are shaped to have summed curvatures $c'$ and $c''$ such that $$\frac{c'}{c''} = -\frac{n_2'' - n_1''}{n_2' - n_1'}$$

wherein $n_1'$ and $n_1''$ are the respective indices of refraction of the two elements at a first preselected wavelength $\lambda_1$ and $n_2'$ and $n_2''$ are the respective indices of refraction of the two elements at a second preselected wavelength $\lambda_2$. The wavelengths $\lambda_1$ and $\lambda_2$ are preselected design parameters and are selected to fall within the range of wavelengths within which the materials of both lens elements are essentially transparent and over which their partial dispersions match. As is understood by those skilled in the art, determinations of the summed curvatures of the two elements in a doublet in this fashion is conventional in order to provide an achromaticity at the two preselected wavelengths $\lambda_1$ and $\lambda_2$. However, when the two lens element materials are arbitrarily selected, there will typically be some deviation from achromaticity at wavelengths between the outside of the two preselected values.

In accordance with the practice of the present invention, substantial achromaticity throughout the useful band of wavelengths is obtained by constructing the elements 13 and 15 of particular pairs of alkali halides which have been discovered to have closely complementary partial dispersion characteristics and overlapping bands of transparency. The four preferred pairs are given in Table I below.

TABLE I

NaCl—KCl
KBr—NaCl
KI—KBr, and
CsI—CsBr

Pairs of materials having the desired matching characteristics can be identified in that their indices of refraction, identified as N and $n$ respectively, conform closely to a linear relationship $$(n-1) = k(N-1) + C$$

over the spectral range of interest where $k$ and $c$ are constants.

Table II below gives the exact relationships of the materials constituting the preferred pairs, together with the range of wavelengths over which the relationship holds.

TABLE II

| Linear relationship | Wavelength range ($\mu$) |
|---|---|
| $(n-1)_{KCl} = 0.5846(N-1)_{NaCl} + 0.1675$ | 1.5–14 |
| $(n-1)_{NaCl} = 3.1135(N-1)_{KBr} - 1.1446$ | 3–14 |
| $(n-1)_{KBr} = 1.4398(N-1)_{KI} - 0.3667$ | 6–24 |
| $(n-1)_{CsBr} = 1.7145(N-1)_{CsI} - 0.6042$ | 10–38 |

The extent to which the relationships stated in Table II hold valid can be conveniently indicated in either of two ways. In Table III below, variation in focal length of a "thin lens" from the nominal or selected value is given (in parts per thousand) for each of the four preferred pairs over the respective range of wavelengths of interest, making the usual "thin lens" assumptions.

TABLE III
Chromatic variation of focal length
[In parts per thousand]

| $\lambda$ in $\mu$ | n:KCl N:NaCl | n:NaCl N:KBr | n:KBr N:KI | n:CsBr N:CsI |
|---|---|---|---|---|
| 1.5 | +1.9 | | | |
| 2 | ±0.0 | | | |
| 2.5 | −0.9 | | | |
| 3 | −1.4 | −1.5 | | |
| 3.5 | −1.6 | −1.0 | | |
| 4 | −1.7 | −0.6 | | |
| 4.5 | −1.8 | −0.4 | | |
| 5 | −1.7 | −0.2 | | |
| 6 | −1.6 | ±0.0 | −0.1 | |
| 7 | −1.3 | +0.1 | −0.1 | |
| 8 | −1.0 | +0.2 | ±0.0 | |
| 9 | −0.6 | +0.3 | +0.1 | |
| 10 | ±0.0 | +0.2 | +0.1 | |
| 12 | +1.3 | ±0.0 | +0.3 | −0.3 |
| 14 | +3.2 | −0.7 | +0.4 | −0.4 |
| 16 | | | +0.4 | ±0.0 |
| 18 | | | +0.4 | +0.1 |
| 20 | | | +0.3 | +0.3 |
| 22 | | | ±0.0 | +0.5 |
| 24 | | | −0.6 | +0.6 |
| 26 | | | | +0.6 |
| 28 | | | | +0.6 |
| 30 | | | | +0.4 |
| 32 | | | | ±0.0 |
| 34 | | | | −0.6 |
| 36 | | | | −1.4 |
| 38 | | | | −2.6 |

Table IV below gives, for various wavelengths, the diameter of an $f/4$ doublet lens for which the diameter of the chromatic aberration blur circle is equal to the Airy disk diffraction blur circle for the same lens. This value serves as a convenient figure of merit for doublet lenses according to the invention, as is explained in greater detail hereinafter.

TABLE IV

| $\lambda$ | NaCl KCl | NaCl KBr | KBr KI | CsBr CsI |
|---|---|---|---|---|
| 1.5 | .8 | | | |
| 2.0 | ∞ | | | |
| 2.5 | 2.7 | | | |
| 3.0 | 2.2 | 1.9 | | |
| 3.5 | 2.2 | 3.4 | | |
| 4.0 | 2.3 | 6.5 | | |
| 4.5 | 2.6 | 11.5 | | |
| 5.0 | 2.9 | 22.0 | | |
| 6.0 | 3.8 | ∞ | 48.0 | |
| 7.0 | 5.2 | 48.6 | 140.0 | |
| 8.0 | 8.0 | 35.1 | ∞ | |
| 9.0 | 15.9 | 34.5 | 180.0 | |
| 10.0 | ∞ | 41.5 | 77.0 | |
| 12 | 9.0 | ∞ | 44.0 | 34.0 |
| 14 | 4.3 | 21.5 | 35.3 | 48.0 |
| 16 | | | 51.0 | ∞ |
| 18 | | | 41.0 | 360.0 |
| 20 | | | 64.0 | 72.0 |
| 22 | | | ∞ | 47.0 |
| 24 | | | 43.0 | 40.0 |
| 26 | | | | 40.0 |
| 28 | | | | 47.0 |
| 30 | | | | 78.0 |
| 32 | | | | ∞ |
| 34 | | | | 55.0 |
| 36 | | | | 25.0 |
| 38 | | | | 15.0 |

The lens diameters given in Table IV were arrived at by calculating first the refracting surface radii: Values of R, for the component of larger index N; and $r$, for the other component of index $n$. These radii are derived for a thin lens combination (a plano-concave for the material with greater dispersion; and plano-convex for the other) as follows: If we represent the index relationship by $$(n-1) = k(N-1) + C$$

where C can be positive or negative; then $$r = C/F = Cf$$

If C is positive, the lesser index material will be used for the plano-convex element; if C is negative, the lesser index material will be used for the plano-concave element. Here F is the aggregate lens power of the desired design, or $f$ is its focal length. And $$R = -\frac{r}{k}$$

Then we calculate $\Delta f$—the variation of $f$ for wavelength $\lambda$ from the design focal length, $$f_0 = \frac{N_0 - 1}{R} + \frac{n_0 - 1}{r}$$

Here the indices $N_0$ and $n_0$ correspond to the wavelengths marked ∞ in Table IV. The chromatic blur circle diameter for wavelength $\lambda$ at the design focal plane is the product:

$$\Delta f \frac{D_0}{f_0}$$

On equating this diameter with the diameter of the Airy, diffraction blur circle, $$2.44 \lambda \frac{f_0}{D_0}$$

with $f_0/D_0=4.1$; and on expressing $\lambda$, the wavelength, in microns $\mu$, we get, for $D_0$ in cm.:

$$D_0 = \frac{\lambda}{1000 \frac{\Delta f}{f_0}}$$

This diameter, $D_0$, does not mean that an $f/4$ lens combination of that aperture formed from plano-convex and plano-concave components will be diffraction limited. Rather, $R_0$ is interpreted only as a figure of merit to illustrate the degree to which partial dispersions match. An actual lens, however, can be designed with "bent" components, and with an air space, which will optimize performance characteristics to design criteria.

The four lens material combinations that are described in Tables I, II, III and IV have the following combination of properties, not heretofore recognized:

(1) Each pair is effectively achromatic over an extended wavelength range in the infrared (where diffraction blur circles are large because of the long wavelength).
(2) Each pair of alkali-halide materials is commercially available in pieces large enough to make practical lenses.
(3) Each pair is characterized by nearly equal coefficients of thermal expansion, making their fabrication as doublets practical. These coefficients are set forth in Table V below.

TABLE V

Alkali halide: Thermal expansion coefficient
LiF ---------------------- $370 \times 10^{-7}$ per ° C.
NaCl --------------------- 440.
KBr ---------------------- 430.
KI ----------------------- 426.
CsBr --------------------- 479.
CsI ---------------------- 500.
KCl ---------------------- 360.

As noted previously, the materials employed for the two elements of the lens of this invention cannot be arbitrarily selected and obtain the desirable broad bands of achromaticity, matching thermal coefficients and overlapping transmission characteristics which are achieved by the particular pairs identified in connection with the discovery of the present invention. Rather, it appears that these pairs are exceptional and provide results not heretofore contemplated in the art of infrared optics.

While the lens of FIG. 1, which conforms to the requirements of so-called "thin lens" calculation, is useful for the purpose of illustrating the advantages of the material pairs of the present invention, it should be understood that these advantages are also present in more complex doublet lens, e.g., those in which allowance is made for the finite thicknesses of the elements; those which employ an air space between the elements to reduce spherical aberrations and field restricting aberrations; and even achromatized Fresnel lenses. The computing procedures for determining the proper lens curvatures to take account of lens thicknesses and minimize spherical and other aberrations are well established and may be straightforwardly applied to doublet lenses of the present invention.

In the design of a doublet lens of specified aperture and focal length, one has, as design parameters: the index and dispersion of two component materials; four radii of curvature; two lens thicknesses; and the air spacing between the components. In addition, one gives priority to certain desired characteristics. For example, in a photoengraving lens, used with visible light, the priority is given to freedom from distortion, at the expense of lens speed.

Figure 2:
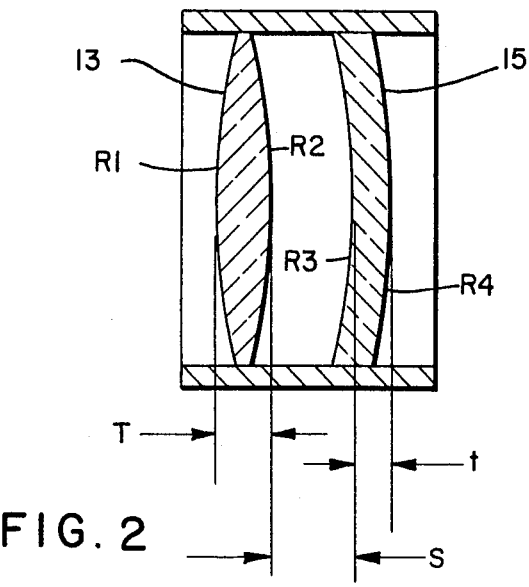
FIG. 2 is a side view, in section, of a doublet lens according to the invention employing relatively thick elements having an air space therebetween.

Table VI gives optimized designs, obtained using a conventionally programmed digital computer, for three NaCl—KBr doublets of $f/16$ aperture and 160 cm. nominal focal length. Each of these lenses employs an air space between the elements, the arrangement being illustrated in FIG. 2 where the various radii and dimensions referenced in Table VI are identified.

TABLE VI

Component of $f/16$ lenses with 160 cm. nominal focal length, with parallel light incident on the outside KBr surface, #1

[Dimensions are given in centimeters, except blur circle diameters]

|  | Design I | Design II | Design III |
|---|---|---|---|
| KBr Index | 1.53320 | 1.53320 | 1.53320 |
| Surface #1 | 104.763 | 84.939 | 55.459 |
| Surface #2 | 116.487 | 155.486 | ∞ |
| Thickness | 1.513 | 2.258 | 1.514 |
| Air space | 1.459 | 1.674 | 1.510 |
| NaCl Index | 1.51630 | 1.616 | 1.51630 |
| Surface #3 | 85.134 | 111.013 | ∞ |
| Surface #4 | 197.450 | 451.765 | 148.288 |
| Thickness | 1.583 | | 1.533 |
| Best compromise field position from vertex of surface #4 | 156.325 | 155.053 | 154.602 |
| Field (cm. diameter) | 6 | 3 | |
| Blur circle | ~110$\mu$ | ~65$\mu$ | >>110$\mu$ |

Design I, as compared to Design II, gives priority to field diameter (6 cm. rather than 3 cm.). It is evident in Table VI that the larger field was achieved at the expense of definition (blur circle 110$\mu$ rather than 65$\mu$). Design III was optimized under the additional constraint that the components each have one surface flat. Design III, although it is an optimized design under the constraints mentioned, is inferior to Designs I or II as evidenced by the larger blur circle. Such inferior designs are, however, suitable for many purposes, such as for focusing sources on slits or slits on detectors. In general, an optimized design for any specific use may be readily obtained with modern computers. Thus, the novelty of the present invention does not reside in any particular or specific design since many lens computer program are extent for this purpose. Rather, the important circumstance that makes the new doublets attractive is tha essenially conventional designs, such as Design I, have invariant focal power over extended wavelength ranges in the infrared by virtue of employing materials in accordance with the present invention. As will be understood by those skilled in the art, lenses employing the teaching of the present invention may also be constructed having aspheric surfaces.

The lens designs of Table VI were computed in conjunction with the design of a Hadamard transform spectroscope intended for use in studies of the infrared transmission of the atmosphere for the detection and/or monitoring of pollutants as revealed by their characteristic infrared atmospheric absorption, and other characteristics. Design I was the one actual selected for construction. In connection with this same apparatus, a second KBr—NaCl lens was designed for focusing an image formed by the first lens onto a detector. The design of this second lens is given in Table VII below. Surface designations for it are again those given in FIG. 2.

TABLE VII

[All dimensions are given in millimeters]

Surface #1 ------------------------------------- 30.83
Surface #2 ------------------------------------- 36.19
Thickness KBr ---------------------------------- 6.52
Air Space -------------------------------------- 3.51
Surface #3 ------------------------------------- 23.44
Surface #4 ------------------------------------- 50.62
Thickness NaCl --------------------------------- 6.10
Diameter --------------------------------------- 25.4

This design was calculated on the basis that the object image distance would be 240 mm. from the outside KBr surface (surface #1) and the reduced image at the detector would be 48.98 mm. from the outside NaCl surface (surface #4). This lens is worked at approximately $f/4$; aperture ratio.

As will also be apparent to those skilled in the art, doublet lenses in accordance with the present invention may be used in conjunction with prisms and other optical elements which can also be made achromatic by employing material pairs whose partial dispersion characteristics match. For example, a positive element of KCl, KBr or KI can be fitted into a matching concave surface of a crystal of NaCl, NaCl or KBr, respectively; and designed so that light from a slit is collimated within the crystal; or so that parallel light emerging from it through the positive element is achromatically focused. In this instance, one of the four possible lens surface does not have to actually be formed, being immersed in material identical to the respective lens component.

As some of the alkali halide materials used in the practice of the present invention are hygroscopic, it may be desirable in some instances to, in effect, split the least hygroscopic element into two parts, one on each side of the more hygroscopic element so as to protect it. The essential characteristic of the lens as a doublet is, however, retained.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A doublet lens for infrared radiation over a range of wavelengths including a pair of significantly differing wavelengths $\lambda_1$ and $\lambda_2$, said doublet comprising:
   a pair of lens elements, each element being constructed of a respective one of a pair of alkali halides, said pair being selected from the group of pairs consisting of Nacl—KCl,
   KBr—NaCl,
   KI—KBr, and
   CsI—CsBr said elements having respective summed curvatures such that the focal length of the doublet lens is the same at said pair of wavelengths $\lambda_1$ and $\lambda_2$, whereby said doublet lens is essentially achromatic over said range of wavelengths.

2. A doublet lens as set forth in claim 1 wherein one of said elements is plano-concave and the other is plano-convex.

3. A doublet lens as set forth in claim 1 wherein said elements are in optical contact.

4. A doublet lens for infrared radiation over a range of wavelengths including a pair of significantly differing wavelengths $\lambda_1$ and $\lambda_2$, said doublet comprising:
   a pair of lens elements, each element being constructed of a respective one of a pair of alkali halides, said pair being selected from the group of pairs consisting of NaCl—KCl
   KBr—NaCl,
   KI—KBr, and
   CsI—CsBr said elements having respective summed curvatures $c'$ and $c''$ such that $$\frac{c'}{c''} = -\frac{n_2'' - n_1''}{n_2' - n_1'}$$

where $n_1'$ and $n_1''$ are the respective indices of refraction of the two elements at wavelength $\lambda_1$ and $n_2'$ and $n_2''$ are the respective indices of refraction of the two elements at wavelength $\lambda_2$,
   whereby said doublet lens is substantially achromatic over said range of wavelengths.

5. A doublet lens as set forth in claim 4 wherein said elements are relatively thin and are in optical contact.

6. A doublet lens as set forth in claim 5 wherein one of said elements is plano-concave and the other is plano-convex and wherein the plane surfaces of said elements are in optical contact.

7. A doublet lens for infrared radiation comprising first and second elements, each of said elements being made of a different alkali halide material, the indices of refraction of said elements being N and $n$ respectively, the relationship of said indices of refraction over a range of spectral interest being substantially defined by $$(n-1) = k(N-1) + c$$

where $k$ and $c$ are constants for the particular pair of alkali halides and C may be positive or negative, whereby the doublet lens is substantially achromatic over the spectral range of interest.

8. A doublet lens as set forth in claim 7 wherein said materials are NaCl and KCl.

9. A doublet lens as set forth in claim 7 wherein said materials are KBr and NaCl.

10. A doublet lens as set forth in claim 7 wherein said materials are KI and KBr.

11. A doublet lens as set forth in claim 7 wherein said materials are CsI and CsBr.

References Cited

Isomet Technical Bulletin 157, "Synthetic Optical Crystals," April 1957, cover page plus pages 1–8.

Herzberger et al.: "Refractive Indices of Infrared Optical Materials and Color Correction of Infrared Lenses," Journal of the Optical Society of America, vol. 52, No. 4, April 1962, pp. 420–427.

JOHN K. CORBIN, Primary Examiner

U.S. Cl. X.R.

350—211, 232, 233